US012407113B2

(12) United States Patent
Wu

(10) Patent No.: US 12,407,113 B2
(45) Date of Patent: Sep. 2, 2025

(54) ANTENNA ASSEMBLY AND ELECTRONIC DEVICE

(71) Applicant: GUANGDONG OPPO MOBILE TELECOMMUNICATIONS CORP., LTD., Guangdong (CN)

(72) Inventor: Xiaopu Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 238 days.

(21) Appl. No.: 18/343,396

(22) Filed: Jun. 28, 2023

(65) Prior Publication Data

US 2023/0344152 A1 Oct. 26, 2023

Related U.S. Application Data

(63) Continuation of application No. PCT/CN2021/131214, filed on Nov. 17, 2021.

(30) Foreign Application Priority Data

Dec. 29, 2020 (CN) ........................ 202011608717.6

(51) Int. Cl.
*H01Q 21/30* (2006.01)
*H01Q 1/36* (2006.01)
*H01Q 1/52* (2006.01)

(52) U.S. Cl.
CPC ............... *H01Q 21/30* (2013.01); *H01Q 1/36* (2013.01); *H01Q 1/521* (2013.01)

(58) Field of Classification Search
CPC .......... H01Q 1/243; H01Q 1/36; H01Q 1/521; H01Q 21/30; H01Q 5/328; H01Q 5/335; H01Q 5/35; H01Q 9/42
See application file for complete search history.

(56) References Cited

U.S. PATENT DOCUMENTS 7,023,909 B1 * 4/2006 Adams ................. H01Q 1/2275 343/907
9,130,274 B1 * 9/2015 Vincent .................... H01Q 9/32
(Continued)

FOREIGN PATENT DOCUMENTS

CN 106450662 2/2017
CN 108346863 7/2018
(Continued)

OTHER PUBLICATIONS

Yin et al., "Design of High-gain Circularly Polarized Radial Line Slot Antenna at Ka Band," Journal of Microwaves, 2017, vol. 33.
(Continued)

*Primary Examiner* — Thien M Le
(74) *Attorney, Agent, or Firm* — Hodgson Russ LLP

(57) ABSTRACT

An antenna assembly and an electronic device are provided in implementations of the disclosure. The antenna assembly includes a first antenna element and a second antenna element. The first antenna element is configured to generate multiple first resonant modes to transmit/receive an electromagnetic wave signal of a first band. The first antenna element includes a first radiator. The second antenna element is configured to generate at least one second resonant mode to transmit/receive an electromagnetic wave signal of a second band. A maximum frequency of the first band is less than a minimum frequency of the second band. The second antenna element includes a second radiator. A first gap is defined between the second radiator and the first radiator. The second radiator is configured to be in capacitive coupling with the first radiator through the first gap.

19 Claims, 11 Drawing Sheets

(56) References Cited

U.S. PATENT DOCUMENTS

| | | | | |
|---|---|---|---|---|
| 9,762,710 | B2 | 9/2017 | Lee et al. | |
| 2006/0203421 | A1* | 9/2006 | Morris | H01G 5/16<br>257/E21.008 |
| 2017/0170546 | A1* | 6/2017 | Li | H01Q 1/38 |
| 2019/0131694 | A1 | 5/2019 | Lee et al. | |
| 2020/0373669 | A1 | 11/2020 | Xue et al. | |
| 2021/0075089 | A1* | 3/2021 | Chang | H01Q 1/50 |
| 2021/0305700 | A1* | 9/2021 | Anguera | H01Q 5/40 |

FOREIGN PATENT DOCUMENTS

| | | |
|---|---|---|
| CN | 108511905 | 9/2018 |
| CN | 108631041 | 10/2018 |
| CN | 108832267 | 11/2018 |
| CN | 208386521 | 1/2019 |
| CN | 109586036 | 4/2019 |
| CN | 109687111 | 4/2019 |
| CN | 110137671 | 8/2019 |
| CN | 111180872 | 5/2020 |
| CN | 111509368 | 8/2020 |
| CN | 111628298 | 9/2020 |
| CN | 112002994 | 11/2020 |
| CN | 112086753 | 12/2020 |
| CN | 112114202 | 12/2020 |
| GB | 2561445 | 10/2018 |
| WO | 2019071848 | 4/2019 |
| WO | 2020119368 | 6/2020 |
| WO | 2020173298 | 9/2020 |

OTHER PUBLICATIONS

Sun et al., "Substrate-Integrated Two-Port Dual-Frequency Antenna," IEEE Transactions on Antennas and Propagation, 2016, vol. 64, No. 8.

CNIPA, Notification of Grant of Patent Right for Invention for CN Application No. 202011608717.6, Nov. 10, 2023.

WIPO, International Search Report and Written Opinion for International Application No. PCT/CN2021/131214, Feb. 10, 2022.

Wang et al., "Design of mixed-feed mode printing multi-band monopole antenna," Applied Science and Technology, Apr. 2013, vol. 40, No. 2.

CNIPA, First Office Action for CN Application No. 202011608717.6, Oct. 8, 2022.

EPO, Extended European Search Report for EP Application No. 21913565.4, Jun. 3, 2024.

CNIPA, Second Office Action for CN Application No. 202011608717.6, Jun. 29, 2023.

* cited by examiner

ANTENNA ASSEMBLY AND ELECTRONIC DEVICE

CROSS-REFERENCE TO RELATED APPLICATIONS

The application is a continuation of International Application No. PCT/CN2021/131214, filed Nov. 17, 2021, which claims priority to Chinese Patent Application No. 202011608717.6, filed Dec. 29, 2020, the entire disclosures of which are incorporated herein by reference.

TECHNICAL FIELD

The disclosure relates to the field of communications technologies, and in particular, to an antenna assembly and an electronic device.

BACKGROUND

With the development of technologies, electronic devices such as mobile phones that have communication functions become more and more popular, and the functions become more and more powerful. The electronic device generally includes an antenna assembly to implement the communication function of the electronic device. How to improve communication quality of the electronic device and at the same time facilitate miniaturization of the electronic device becomes a technical problem to be solved.

SUMMARY

An antenna assembly and an electronic device are provided in the disclosure for improving communication quality and facilitating overall miniaturization.

In a first aspect, an antenna assembly is provided in implementations of the disclosure. The antenna assembly includes a first antenna element and a second antenna element. The first antenna element is configured to generate multiple first resonant modes to transmit and receive an electromagnetic wave signal of a first band. The first antenna element includes a first radiator. The second antenna element is configured to generate at least one second resonant mode to transmit and receive an electromagnetic wave signal of a second band. A maximum frequency of the first band is less than a minimum frequency of the second band. The second antenna element includes a second radiator. A first gap is defined between the second radiator and the first radiator. The second radiator is configured to be in capacitive coupling with the first radiator through the first gap. At least one of the multiple first resonant modes is formed through the capacitive coupling between the first radiator and the second radiator.

In a second aspect, an electronic device is provided in the implementations of the disclosure. The electronic device includes a housing and the antenna assembly. The antenna assembly is partially integrated at the housing; or the antenna assembly is disposed inside the housing.

In the antenna assembly provided in the implementations of the disclosure, the first gap is defined between the first radiator of the first antenna element and the second radiator of the second antenna element, the first antenna element is configured to transmit/receive an electromagnetic wave signal of a relatively high band, and the second antenna element is configured to transmit/receive an electromagnetic wave signal of a relatively low band. Thus, on the one hand, the first radiator can be in capacitive coupling with the second radiator during operation of the antenna assembly to generate electromagnetic wave signals of an increased number of modes, widening a bandwidth of the antenna assembly; on the other hand, the first antenna element is configured to operate in a middle-high band (MEM) and the second antenna element is configured to operate in a low band (LB), effectively improving an isolation between the first antenna element and the second antenna element, and facilitating radiation of an electromagnetic wave signal of a desired band by the antenna assembly. As such, cooperative multiplexing of the first radiator of the first antenna element and the second radiator of the second antenna element can be achieved, an integration of multiple antenna elements can be realized, and thus not only a bandwidth of the antenna assembly can be widened, but also an overall size of the antenna assembly can be reduced, thereby facilitating overall miniaturization of the electronic device.

BRIEF DESCRIPTION OF THE DRAWINGS

To describe technical solutions in implementations of the disclosure more clearly, the following briefly introduces the accompanying drawings required for describing the implementations. Apparently, the accompanying drawings in the following description only illustrate some implementations of the disclosure. Those of ordinary skill in the art may also obtain other drawings based on these accompanying drawings without creative efforts.

DETAILED DESCRIPTION

The following clearly and completely describes the technical solutions in the implementations of the disclosure with reference to the accompanying drawings in the implementations of the disclosure. Apparently, the described implementations are merely a part rather than all of the implementations of the disclosure. The implementations described herein can be combined with each other appropriately.

Figure 1:
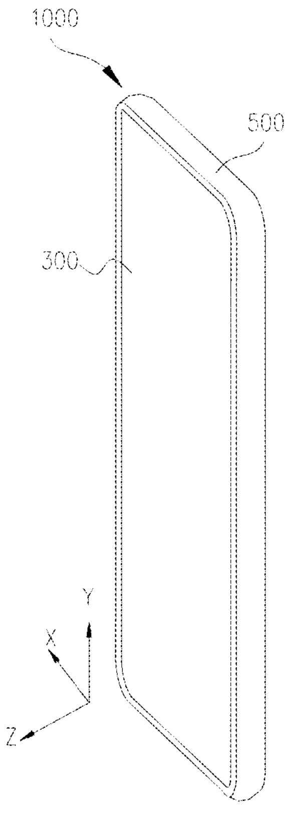
FIG. 1 is a schematic structural view of an electronic device provided in implementations of the disclosure.

Referring to FIG. 1, FIG. 1 is a schematic structural view of an electronic device provided in the implementations of the disclosure. The electronic device 1000 may be a device that can transmit/receive (transmit and/or receive) an electromagnetic wave signal, such as a telephone, a television, a tablet computer, a mobile phone, a camera, a personal computer, a notebook computer, an on-board equipment, an earphone, a watch, a wearable equipment, a base station, a vehicle-borne radar, and a customer premise equipment (CPE). Taking the electronic device 1000 as a mobile phone as an example, for ease of illustration, the electronic device 1000 is defined by taking the electronic device 1000 at a first view angle as a reference, a width direction of the electronic device 1000 is defined as an X direction, a length direction of the electronic device 1000 is defined as a Y direction, and a thickness direction of the electronic device 1000 is defined as a Z direction. A direction indicated by an arrow is a forward direction.

Figure 2:
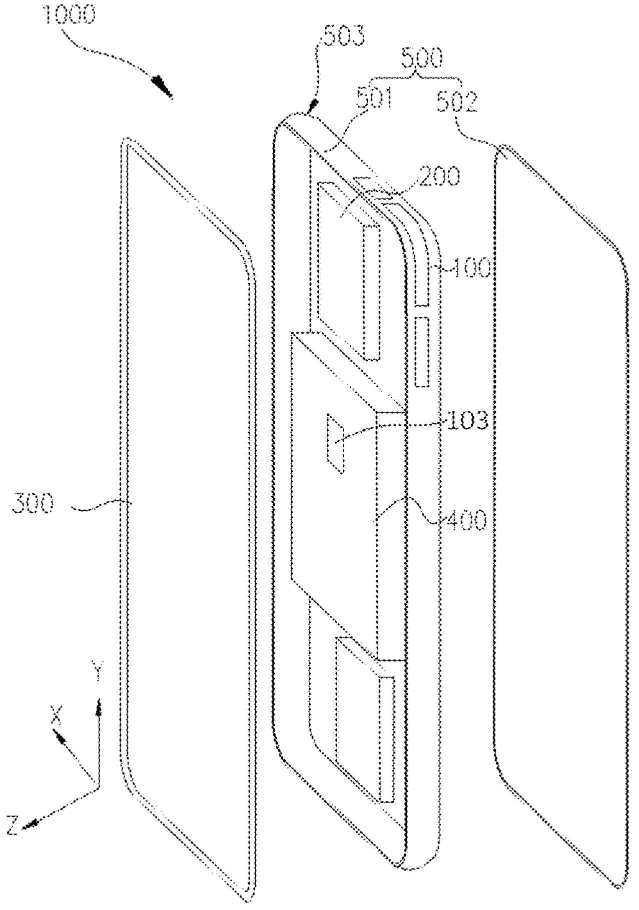
FIG. 2 is a schematic exploded view of an electronic device in FIG. 1.

Referring to FIG. 2, the electronic device 1000 includes an antenna assembly 100. The antenna assembly 100 is configured to transmit/receive a radio frequency (RF) signal to implement a communication function of the electronic device 1000. At least some components of the antenna assembly 100 are disposed at a main printed circuit board 200 of the electronic device 1000. It can be understood that, the electronic device 1000 may further include a display screen 300, a battery 400, a housing 500, a camera, a microphone, a receiver, a loudspeaker, a face recognition module, a fingerprint recognition module, and other components that can implement basic functions of a mobile phone, which are not described again herein.

Figure 3:
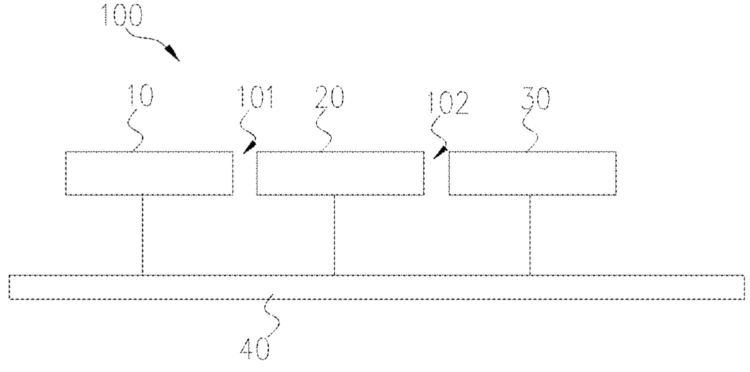
FIG. 3 is a schematic structural view of an antenna assembly provided in implementations of the disclosure.

Referring to FIG. 3, the antenna assembly 100 provided in the implementations of the disclosure includes a first antenna element 10, a second antenna element 20, a third antenna element 30, and a reference ground 40. The first antenna element 10 is configured to generate multiple first resonant modes to transmit/receive an electromagnetic wave signal of a first band. The second antenna element 20 is configured to generate at least one second resonant mode to transmit/receive an electromagnetic wave signal of a second band. The third antenna element 30 is configured to generate multiple third resonant modes to transmit/receive an electromagnetic wave signal of a third band. The first band and the second band are different bands, and the third band and the second band are different bands. In some implementations, a maximum frequency of the first band is less than a minimum frequency of the second band. For example, the first band may be a middle-high band (MHB) or an ultra-high band (UHB), the third band may be an MHB or a UHB, and the second band may be a low band (LB). The LB is a frequency range an upper limit of which is less than 1000 MHz, the MHB ranges from 1000 MHz to 3000 MHz, and the UHB ranges from 3000 MHz to 10000 MHz. In other words, a band of an electromagnetic wave signal transmitted/received by the first antenna element 10 may be different from a band of an electromagnetic wave signal transmitted/received by the second antenna element 20, a band of an electromagnetic wave signal transmitted/received by the third antenna element 30 may be different from a band of an electromagnetic wave signal transmitted/received by the second antenna element 20, and a band of an electromagnetic wave signal transmitted/received by the first antenna element 10 may be substantially same as a band of an electromagnetic wave signal transmitted/received by the third antenna element 30. In other implementations, a band of an electromagnetic wave signal transmitted/received by the first antenna element 10, a band of an electromagnetic wave signal transmitted/received by the second antenna element 20, and a band of an electromagnetic wave signal transmitted/received by the third antenna element 30 may also be different from one another, so that the antenna assembly 100 can have a relatively wide bandwidth. In some implementations of the disclosure, the antenna element is configured to resonate in the resonant mode to transmit/receive an electromagnetic wave signal, for example, the first antenna element 10 is configured to resonate in the multiple first resonant modes to transmit/receive the electromagnetic wave signal of the first band, and the second antenna element 20 is configured to resonate in the at least one second resonant mode to transmit/receive the electromagnetic wave signal of the second band.

In an implementation, the antenna assembly 100 includes the first antenna element 10, the second antenna element 20, and the reference ground 40.

Figure 4:
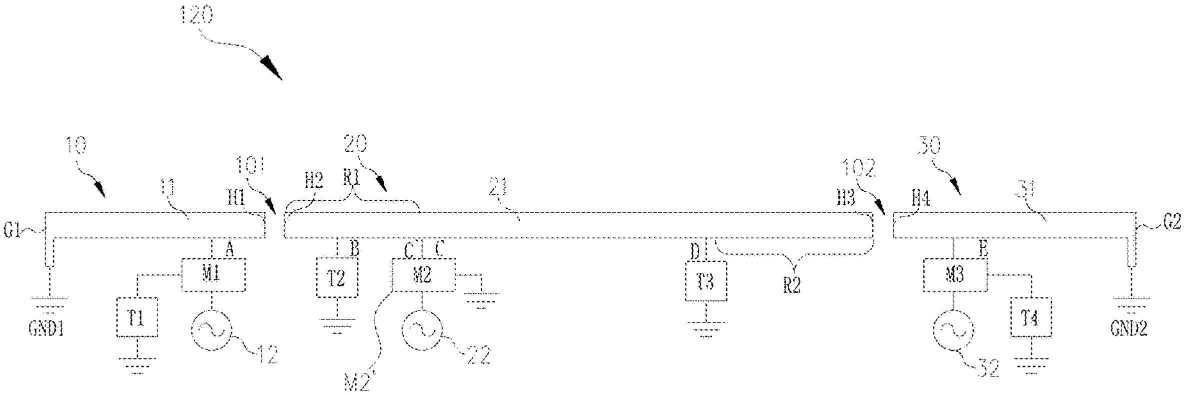
FIG. 4 is a schematic circuit diagram of a first type of antenna assembly in FIG. 3.

Referring to FIG. 4, the first antenna element 10 includes a first radiator 11, a first signal source 12, and a first frequency-tuning (FT) filter circuit M1.

A specific shape of the first radiator 11 is not limited herein. The first radiator 11 may be in a shape which includes, but is not limited to, an elongated shape, a sheet shape, a rod shape, a line shape, a coating shape, a film shape, and the like. In the implementations, the first radiator 11 is in an elongated shape.

Referring to FIG. 4, the first radiator 11 includes a first ground end G1, a first coupling end H1 opposite the first ground end G1, and a first feeding point A disposed between the first ground end G1 and the first coupling end H1.

The first ground end G1 is electrically connected to the reference ground 40. The reference ground 40 includes a first reference ground GND1. The first ground end G1 is electrically connected to the first reference ground GND1.

The first FT filter circuit M1 is disposed between the first feeding point A and the first signal source 12. In some implementations, the first signal source 12 is electrically connected to an input port of the first FT filter circuit M1, and an output port of the first FT filter circuit M1 is electrically connected to the first feeding point A of the first radiator 11. The first signal source 12 is configured to generate an excitation signal (also referred to as an RF signal). The first FT filter circuit M1 is configured to filter out a clutter in the excitation signal transmitted by the first signal source 12 to obtain an excitation signal(s) of the MHB and the UHB, and to transmit the excitation signal(s) of the MHB and the UHB to the first radiator 11, enabling the first radiator 11 to transmit/receive the electromagnetic wave signal of the first band.

Referring to FIG. 4, the second antenna element 20 includes a second radiator 21, a second signal source 22, and a second FT filter circuit M2.

A specific shape of the second radiator 21 is not limited herein. The second radiator 21 may in a shape which includes, but is not limited to, an elongated shape, a sheet shape, a rod shape, a coating shape, a film shape, and the like. In the implementations, the second radiator 21 is in an elongated shape.

Referring to FIG. 4, the second radiator 21 includes a second coupling end H2, a third coupling end H3 opposite the second coupling end H2, and a second feeding point C disposed between the second coupling end H2 and the third coupling end H3.

The second coupling end H2 and the first coupling end H1 are spaced apart from each other to define the first gap 101. In other words, the first gap 101 is defined between the second radiator 21 and the first radiator 11. The first radiator 11 is in capacitive coupling with the second radiator 21 through the first gap 101. The term "capacitive coupling" means that, when an electric field is generated between the first radiator 11 and the second radiator 21, a signal of the first radiator 11 can be transmitted to the second radiator 21 through the electric field, and a signal of the second radiator 21 can be transmitted to the first radiator 11 through the electric field, so that an electrical signal can be transmitted between the first radiator 11 and the second radiator 21 even in the case where the first radiator 11 is spaced apart from the second radiator 21.

A specific size of the first gap 101 is not limited herein. In the implementations, a size of the first gap 101 is less than or equal to 2 mm, but is not limited thereto 2 mm, facilitating capacitive coupling between the first radiator 11 and the second radiator 21.

A specific formation manner of the first radiator 11 and the second radiator 21 is not limited herein. The first radiator 11 may be a flexible printed circuit (FPC) antenna radiator, or a laser direct structuring (LDS) antenna radiator, or a print direct structuring (PDS) antenna radiator, or a metal branch, or the like. The second radiator 21 may be an FPC antenna radiator, an LDS antenna radiator, a PDS antenna radiator, a metal branch, or the like.

In some implementations, each of the first radiator 11 and the second radiator 21 is made of a conductive material, which includes, but is not limited to, metal, transparent conductive oxide (for example, indium tin oxide (ITO)), carbon nanotube, graphene, and the like. In the implementations, the first radiator 11 is made of a metal material, for example, silver or copper.

The second FT filter circuit M2 is disposed between the second feeding point C and the second signal source 22. In some implementations, the second signal source 22 is electrically connected to an input port of the second FT filter circuit M2, and an output port of the second FT filter circuit M2 is electrically connected to the second radiator 21. The second signal source 22 is configured to generate an excitation signal, and the second FT filter circuit M2 is configured to filter out a clutter in the excitation signal transmitted by the second signal source 22 to obtain an excitation signal of the LB, and to transmit the excitation signal of the LB to the second radiator 21, enabling the second radiator 21 to transmit/receive the electromagnetic wave signal of the second band.

When the antenna assembly 100 is applied to the electronic device 1000, the first signal source 12, the second signal source 22, the first FT filter circuit M1, and the second FT filter circuit M2 may all be disposed at the main printed circuit board 200 of the electronic device 1000. In the implementations, with the first FT filter circuit M1 and the second FT filter circuit M2, a band of an electromagnetic wave signal transmitted/received by the first antenna element 10 is different from a band of an electromagnetic wave signal transmitted/received by the second antenna element 20, thereby improving an isolation between the first antenna element 10 and the second antenna element 20. In other words, with the first FT filter circuit M1 and the second FT filter circuit M2, the electromagnetic wave signal transmitted/received by the first antenna element 10 is isolated from the electromagnetic wave signal transmitted/received by the second antenna element 20 to avoid mutual interference.

The first antenna element 10 is configured to generate the multiple first resonant modes, and the at least one of the multiple first resonant mode is generated through the capacitive coupling between the first radiator 11 and the second radiator 21.

Figure 5:
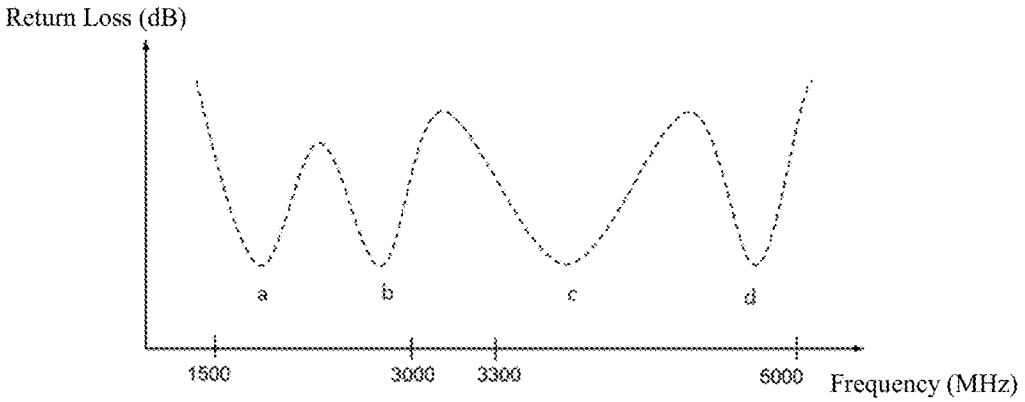
FIG. 5 is a return loss curve diagram of serval resonant modes of a first antenna element in FIG. 4.

Referring to FIG. 5, the multiple first resonant modes include at least a first resonant sub-mode a, a second resonant sub-mode b, a third resonant sub-mode c, and a fourth resonant sub-mode d. It is noted that, the multiple first resonant modes may further include other modes in addition to the first resonant sub-mode a, the second resonant sub-mode b, the third resonant sub-mode c, and the fourth resonant sub-mode d. The first resonant sub-mode a, the second resonant sub-mode b, the third resonant sub-mode c, and the fourth resonant sub-mode d are modes that have relatively high efficiency.

Referring to FIG. 5, both an electromagnetic wave corresponding to the second resonant sub-mode b and an electromagnetic wave corresponding to the third resonant sub-mode c are generated through coupling between the first radiator 11 and the second radiator 21. A band of the first resonant sub-mode a is a first sub-band, a band of the second resonant sub-mode b is a second sub-band, a band of the third resonant sub-mode c is a third sub-band, and a band of the fourth resonant sub-mode d is a fourth sub-band. In an implementation, the first sub-band ranges from 1900 MHz to 2000 MHz, the second sub-band ranges from 2600 MHz to 2700 MHz, the third sub-band ranges from 3800 MHz to 3900 MHz, and the fourth sub-band ranges from 4700 MHz to 4800 MHz. In other words, electromagnetic wave signals corresponding to the multiple first resonant modes are in the MHB (1000 MHz to 3000 MHz) and the UHB (3000 MHz to 10000 MHz). By adjusting resonant frequencies of the above resonant modes, the first antenna element 10 can cover both the MHB and the UHB, and thus have a relatively high efficiency in a desired band.

It can be seen from the above that, in the case where there is no antenna element that can be coupled to the first antenna element 10, the first antenna element 10 can generate the first resonant sub-mode a and the fourth resonant sub-mode d. In the case where the second antenna element 20 is coupled to the first antenna element 10, the first antenna element 10 can generate not only the first resonant sub-mode a and the fourth resonant sub-mode d, but also the second resonant sub-mode b and the third resonant sub-mode c, thereby widening the bandwidth of the antenna assembly 100.

The first radiator 11 is spaced apart from and configured to be coupled to the second radiator 21, that is, the first radiator 11 and the second radiator 21 are shared-aperture (also known as common-aperture) radiators. During operation of the antenna assembly 100, a first excitation signal generated by the first signal source 12 may be coupled to the second radiator 21 through the first radiator 11. In other words, during operation of the first antenna element 10, not only the first radiator 11 may be used to transmit/receive an electromagnetic wave signal, but also the second radiator 21 of the second antenna element 20 may be used to transmit/receive an electromagnetic wave signal, so that the first antenna element 10 can have a relatively wide band. Similarly, the second radiator 21 is spaced apart from and configured to be coupled to the first radiator 11, a second excitation signal generated by the second signal source 22 may also be coupled to the first radiator 11 through the second radiator 21. In other words, during operation of the second antenna element 20, not only the second radiator 21 can be used to transmit/receive an electromagnetic wave signal, but also the first radiator 11 of the first antenna element 10 can be used to transmit/receive an electromagnetic wave signal, so that the second antenna element 20 can have in a relatively wide band. During operation of the second antenna element 20, not only the second radiator 21 but also the first radiator 11 may be used, and during operation of the first antenna element 10, not only the first radiator 11 but also the second radiator 21 may be used, which not only improves a radiation performance of the antenna assembly 100, but also realizes multiplexing of radiators and spatial multiplexing, facilitating a reduction in size of the antenna assembly 100 and a reduction in an overall size of the electronic device 1000.

By a design where the first gap 101 is defined between the first radiator 11 of the first antenna element 10 and the second antenna element 20 of the second radiator 21, the first antenna element 10 is configured to transmit/receive an electromagnetic wave signal of a relatively high band, and the second antenna element 20 is configured to transmit/receive an electromagnetic wave signal of a relatively low band. Thus, on the one hand, the first radiator 11 can be in capacitive coupling with the second radiator 21 during operation of the antenna assembly 100 to generate an increased number of modes, improving the bandwidth of the antenna assembly 100; on the other hand, the first antenna element 10 is configured to operate in the MHB and the second antenna element 20 is configured to operate in the LB, effectively improving the isolation between the first antenna element 10 and the second antenna element 20, and facilitating the antenna assembly 100 to radiate an electromagnetic wave signal of a desired band. As such, cooperative multiplexing of the first radiator 11 of the first antenna element 10 and the second radiator 21 of the second antenna element 20 can be achieved, an integration of multiple antenna elements can be realized, and thus not only the bandwidth of the antenna assembly 100 can be widened, but also an overall size of the antenna assembly 100 can be reduced, thereby facilitating overall miniaturization of the electronic device 1000.

In the related art, a relatively large number of antenna elements are required or an increase in a length of a radiator is required to support the first resonant sub-mode a, the second resonant sub-mode b, the third resonant sub-mode c, and the fourth resonant sub-mode d, resulting in a relatively large size of the antenna assembly. In the implementations of the disclosure, the antenna assembly 100 can support the second resonant sub-mode b and the third resonant sub-mode c without an additional antenna element(s), and therefore, the antenna assembly 100 has a relatively small size. In the case where an additional antenna is required to support the second resonant sub-mode b and an additional antenna is required to support the third resonant sub-mode c, costs of the antenna assembly may be relatively high, when the antenna assembly is applied to the electronic device, it is difficult to stack the antenna assembly with other components. For the antenna assembly 100 in the implementation of the disclosure, no additional antenna is required to support the second resonant sub-mode b and the third resonant sub-mode c, and thus the costs of the antenna assembly 100 is relatively low, and when the antenna assembly 100 is applied to the electronic device 1000, it is relatively easy to stack the antenna assembly 100. In addition, in the case where an additional antenna(s) is required to support the second resonant sub-mode b and the third resonant sub-mode c, RF link insertion loss of the antenna assembly can be increased. The antenna assembly 100 in the disclosure can reduce RF link insertion loss.

An implementation in which a band of an electromagnetic wave transmitted/received by the first antenna element 10 is different from a band of an electromagnetic wave transmitted/received by the second antenna element 20 includes, but is not limited to, the following implementations.

In some implementations, the first signal source 12 and the second signal source 22 may be the same signal source, or may be different signal sources.

In an implementation, the first signal source 12 and the second signal source 22 may be the same signal source, which is configured to transmit an excitation signal to the first FT filter circuit M1 and the second FT filter circuit M2, respectively. The first FT filter circuit M1 may be a filter circuit that blocks a LB signal and allows a MHB signal and a UHB signal to pass, the second FT filter circuit M2 is a filter circuit that blocks a MHB signal and a UHB signal and allows a LB signal to pass, and thus, MHB and UHB parts of the excitation signal flow to the first radiator 11 through the first FT filter circuit M1, enabling the first radiator 11 to transmit/receive the electromagnetic wave signal of the first band, and LB part of the excitation signal flows to the second radiator 21 through the second FT filter circuit M2, enabling the second radiator 21 to transmit/receive the electromagnetic wave signal of the second band.

In another possible implementation, the first signal source 12 and the second signal source 22 are different signal sources. The first signal source 12 and the second signal source 22 may be integrated in the same chip or separately packaged in different chips. The first signal source 12 is configured to generate the first excitation signal, and the first excitation signal is loaded to the first radiator 11 through the first FT filter circuit M1, so that the first radiator 11 can transmit/receive the electromagnetic wave signal of the first band. The second signal source 22 is configured to generate the second excitation signal, and the second excitation signal is loaded to the second radiator 21 through the second FT filter circuit M2, so that the second radiator 21 can transmit/receive the electromagnetic wave signal of the second band.

It can be understood that, the first FT filter circuit M1 includes, but is not limited to, a capacitor(s), an inductor(s), and a resistor(s) that are arranged in series and/or in parallel. The first FT filter circuit M1 may include multiple branches formed by a capacitor(s), an inductor(s), and a resistor(s)

that are arranged in series and/or in parallel, and switches that control connection/disconnection of the multiple branches. By controlling on/off of different switches, a frequency selection parameter (including a resistance value, an inductance value, and a capacitance value) of the first FT filter circuit M1 can be adjusted to adjust a filtering range of the first FT filter circuit M1, so that the first antenna element 10 can transmit/receive the electromagnetic wave signal of the first band. Similarly, the second FT filter circuit M2 includes, but is not limited to, a capacitor(s), an inductor(s), and a resistor(s) that are arranged in series and/or in parallel. The second FT filter circuit M2 may include multiple branches formed by a capacitor(s), an inductor(s), and a resistor(s) that are arranged in series and/or in parallel, and switches that control connection/disconnection of the multiple branches. By controlling on/off of different switches, frequency selection parameters (including a resistance value, an inductance value and a capacitance value) of the second FT filter circuit M2 can be adjusted to adjust a filtering range of the second FT filter circuit M2, so that the second antenna element 20 can transmit/receive the electromagnetic wave signal of the second band. The first FT filter circuit M1 and the second FT filter circuit M2 may also be referred to as matching circuits.

Referring to FIGS. 6 to 13 together, FIGS. 6 to 13 are schematic diagrams of the first FT filter circuit M1 provided in various implementations. The first FT filter circuit M1 includes one or more of the following circuits.

Figure 6:
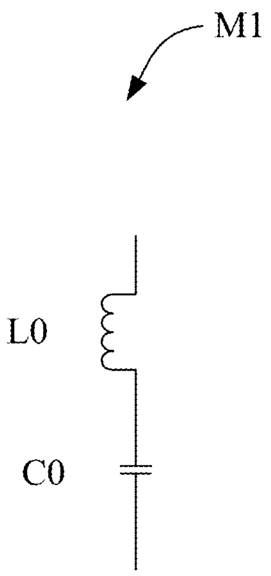
FIG. 6 is a schematic structural diagram of a first type of first frequency-tuning (FT) filter circuit provided in implementations of the disclosure.

Referring to FIG. 6, the first FT filter circuit M1 includes a band-pass circuit formed by an inductor L0 and a capacitor C0 connected in series.

Figure 7:
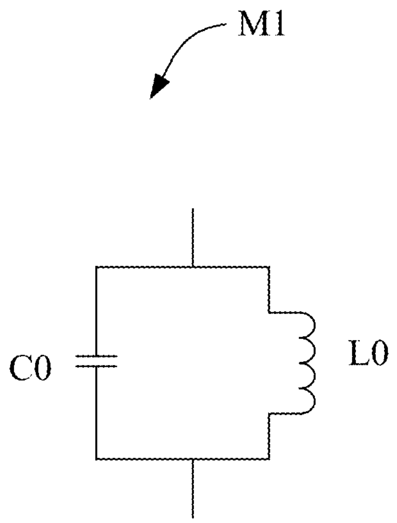
FIG. 7 is a schematic structural diagram of a second type of first FT filter circuit provided in implementations of the disclosure.

Referring to FIG. 7, the first FT filter circuit M1 includes a band-stop circuit formed by an inductor L0 and a capacitor C0 connected in parallel.

Figure 8:
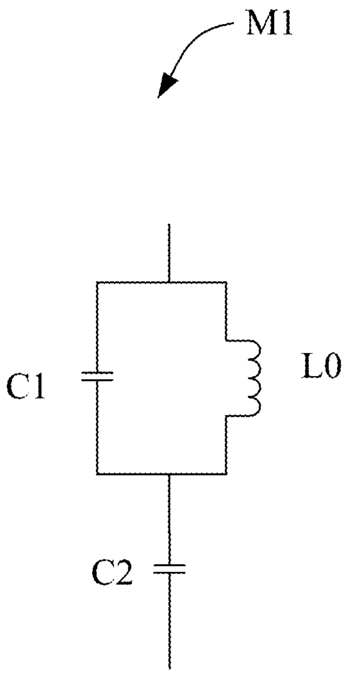
FIG. 8 is a schematic structural diagram of a third type of first FT filter circuit provided in implementations of the disclosure.

Referring to FIG. 8, the first FT filter circuit M1 includes an inductor L0, a first capacitor C1, and a second capacitor C2. The inductor L0 is connected in parallel to the first capacitor C1, and the second capacitor C2 is electrically connected to a node where the inductor L0 is electrically connected to the first capacitor C1.

Figure 9:
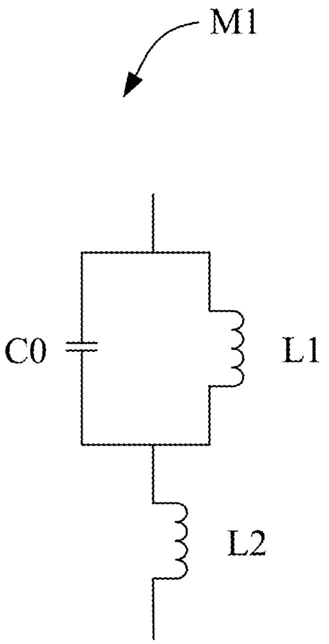
FIG. 9 is a schematic structural diagram of a fourth type of first FT filter circuit provided in implementations of the disclosure.

Referring to FIG. 9, the first FT filter circuit M1 includes a capacitor C0, a first inductor L1, and a second inductor L2. The capacitor C0 is connected in parallel to the first inductor L1, and the second inductor L2 is electrically connected to a node where the capacitor C0 is electrically connected to the first inductor L1.

Figure 10:
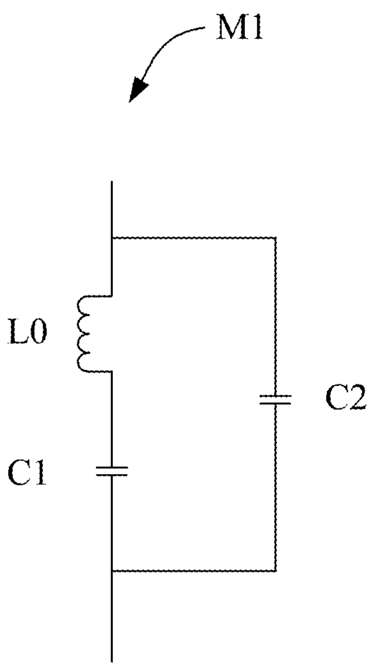
FIG. 10 is a schematic structural diagram of a fifth type of first FT filter circuit provided in implementations of the disclosure.

Referring to FIG. 10, the first FT filter circuit M1 includes an inductor L0, a first capacitor C1, and a second capacitor C2. The inductor L0 is connected in series to the first capacitor C1, one end of the second capacitor C2 is electrically connected to one end of the inductor L0 that is not connected to the first capacitor C1, and the other end of the second capacitor C2 is electrically connected to one end of the first capacitor C1 that is not connected to the inductor L0.

Figure 11:
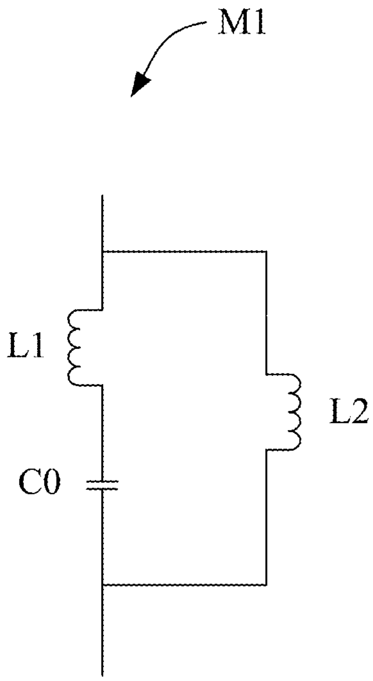
FIG. 11 is a schematic structural diagram of a sixth type of first FT filter circuit provided in implementations of the disclosure.

Referring to FIG. 11, the first FT filter circuit M1 includes a capacitor C0, a first inductor L1, and a second inductor L2. The capacitor C0 is connected in series to the first inductor L1, one end of the second inductor L2 is electrically connected to one end of the capacitor C0 that is not connected to the first inductor L1, and the other end of the second inductor L2 is electrically connected to one end of the first inductor L1 that is not connected to the capacitor C0.

Figure 12:
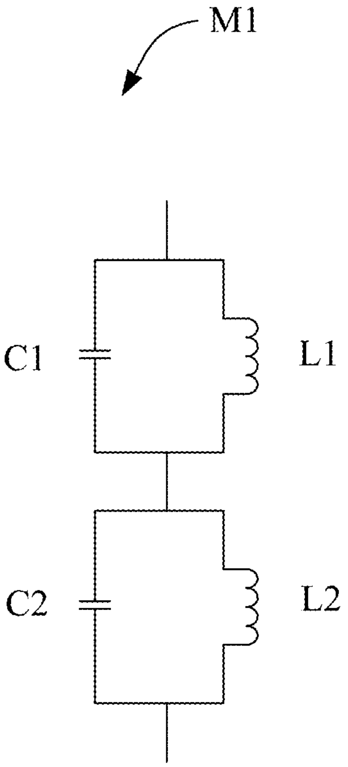
FIG. 12 is a schematic structural diagram of a seventh type of first FT filter circuit provided in implementations of the disclosure.

Referring to FIG. 12, the first FT filter circuit M1 includes a first capacitor C1, a second capacitor C2, a first inductor L1, and a second inductor L2. The first capacitor C1 is connected in parallel to the first inductor L1, the second capacitor C2 is connected in parallel to the second inductor L2, and one end of a circuit formed by the second capacitor C2 and the second inductor L2 connected in parallel is electrically connected to one end of a circuit formed by the first capacitor C1 and the first inductor L1 connected in parallel.

Figure 13:
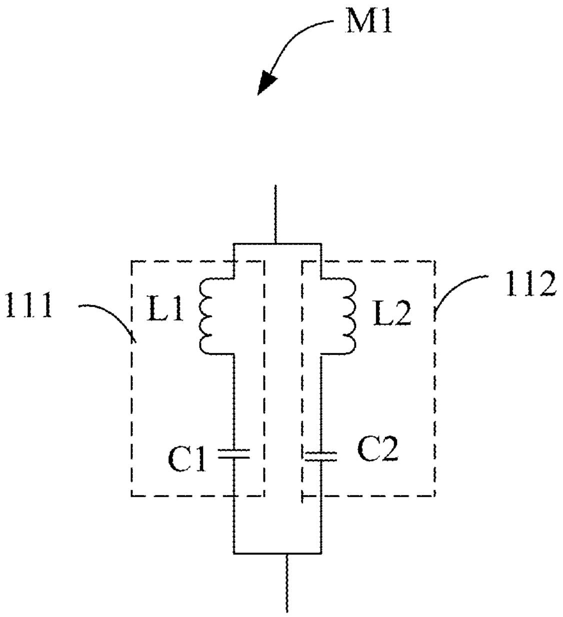
FIG. 13 is a schematic structural diagram of an eighth type of first FT filter circuit provided in implementations of the disclosure.

Referring to FIG. 13, the first FT filter circuit M1 includes a first capacitor C1, a second capacitor C2, a first inductor L1, and a second inductor L2. The first capacitor C1 and the first inductor L1 are connected in series to form a first unit 111, the second capacitor C2 and the second inductor L2 are connected in series to form a second unit 112, and the first unit 111 and the second unit 112 are connected in parallel.

Figure 14:
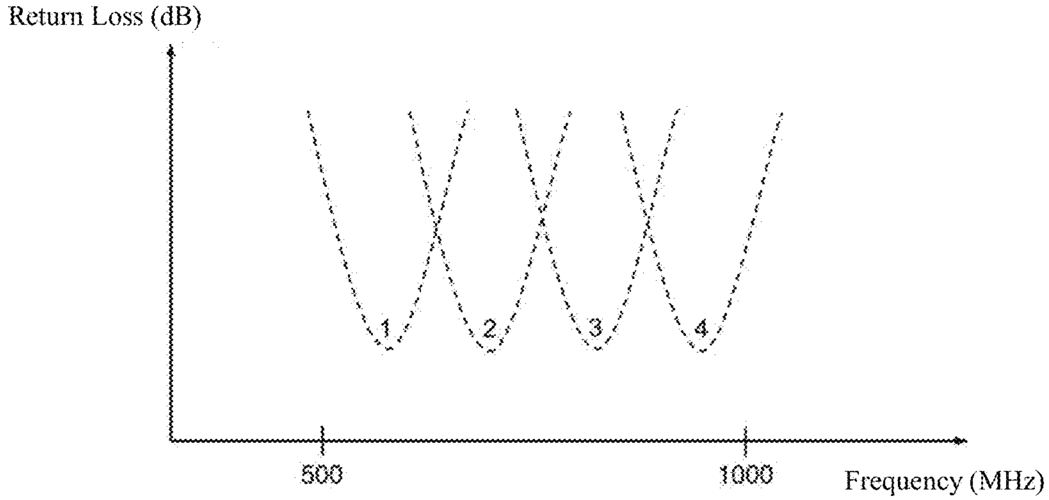
FIG. 14 is a return loss curve diagram of serval resonant modes of a second antenna element in FIG. 4.

Referring to FIG. 14, the second antenna element 20 generates the second resonant mode during operation, and a band of an electromagnetic wave signal corresponding to the second resonant mode is below 1000 MHz, for example, ranges from 500 MHz to 1000 MHz. By adjusting a resonant frequency of the second resonant mode, the second antenna element 20 can cover the LB and have high efficiency in a desired band. In this way, the second antenna element 20 may transmit/receive the electromagnetic wave signal of the LB, which includes all LBs of 4G (also referred to as long term evolution (LTE)) and all LBs of 5G (also referred to as new radio (NR)). When the second antenna element 20 and the first antenna element 10 operate at the same time, the second antenna element 20 and the first antenna element 10 can cover electromagnetic wave signals of all LBs, all MHBs, and all UHBs of 4G and 5G, including LTE bands 1/2/3/4/7/32/40/41, NR 1/3/7/40/41/77/78/79, Wi-Fi 2.4G, Wi-Fi 5G, GPS-L1, GPS-L5, etc., to achieve ultra-wideband carrier aggregation (CA) and the dual connection between the 4G radio access network and the 5G-NR (EN-DC).

Further, referring to FIG. 4, the antenna assembly 100 further includes the third antenna element 30. The third antenna element 30 is configured to transmit/receive the electromagnetic wave signal of the third band. A minimum frequency of the third band is greater than a maximum frequency of the second band. Optionally, the third band is the same as the first band. Optionally, the third band partially overlaps the first band. Optionally, the third band does not overlap the first band, and the minimum frequency of the third band is greater than the maximum frequency of the first band. Alternatively, the first band does not overlap the third band, and the minimum frequency of the first band is greater than the maximum frequency of the third band. In the implementations, each of the first band and the third band ranges from 1000 MHz to 10000 MHz.

Referring to FIG. 4, the third antenna element 30 includes a third signal source 32, a third FT filter circuit M3, and a third radiator 31. The third radiator 31 is disposed at a side of the second radiator 21 away from the first radiator 11. A second gap 102 is defined between the radiator 31 and the second radiator 21. The third radiator 31 is configured to be in capacitive coupling with the second radiator 21 through the second gap 102.

In some implementations, the third radiator 31 includes a fourth coupling end H4 and a second ground end G2 that are respectively at two opposite ends of the third radiator 31, and a third feeding point E disposed between the fourth coupling end H4 and the second ground end G2.

The reference ground 40 further includes a second reference ground GND2. The second ground end G2 is electrically connected to the second reference ground GND2.

The second gap 102 is defined between the fourth coupling end H4 and the third coupling end H3. One port of the third FT filter circuit M3 is electrically connected to the third feeding point E, and the other port of the third FT filter circuit M3 is electrically connected to the third signal source 32. Alternatively, when the antenna assembly 100 is applied to the electronic device 1000, both the third signal source 32 and the third FT filter circuit M3 are disposed at the main printed circuit board 200. Optionally, the third signal source 32, the first signal source 12, and the second signal source 22 are the same signal source. Alternatively, the third signal source 32, the first signal source 12, and the second signal source 22 are different signal sources. The third FT filter circuit M3 is configured to filter out a clutter in an RF signal transmitted by the third signal source 32, enabling the third antenna element 30 to transmit/receive the electromagnetic wave signal of the third band.

The third antenna element 30 is configured to generate the multiple third resonant modes, and at least one of the multiple third resonant modes is generated through capacitive coupling between the second radiator 21 and the third radiator 31.

Figure 15:
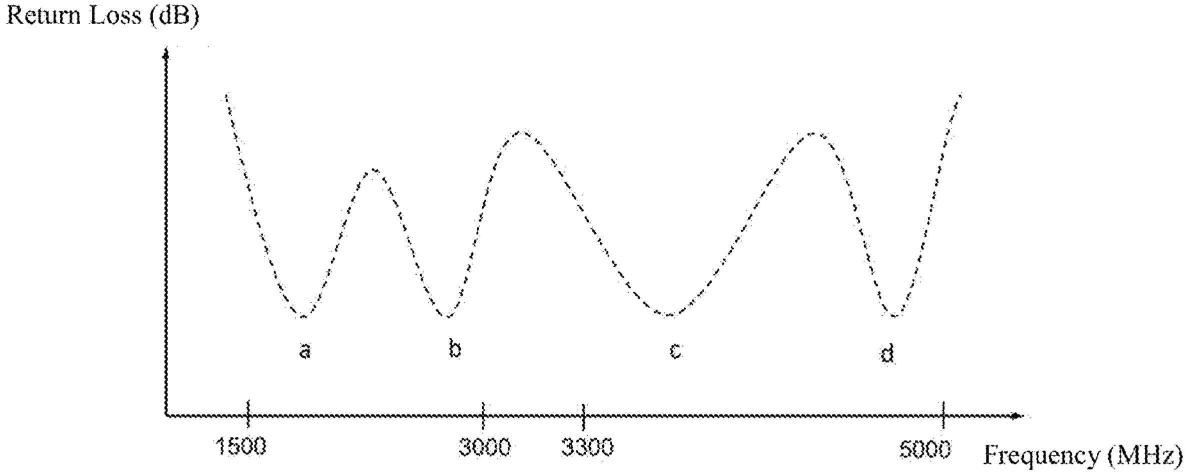
FIG. 15 is a return loss curve diagram of serval resonant modes of a third antenna element in FIG. 4.

Referring to FIG. 15, the multiple third resonant modes include at least a fifth resonant sub-mode e, a sixth resonant sub-mode f a seventh resonant sub-mode g, and an eighth resonant sub-mode h. It is noted that, the multiple third resonant modes may further include other modes in addition to the fifth resonant sub-mode e, the sixth resonant sub-mode f, the seventh resonant sub-mode g, and the eighth resonant sub-mode h. The fifth resonant sub-mode e, the sixth resonant sub-mode f, the seventh resonant sub-mode g, and the eighth resonant sub-mode h are modes that have relatively high efficiency.

Both the sixth resonant sub-mode f and the seventh resonant sub-mode g are generated through coupling between the third radiator 31 and the second radiator 21. A band of the fifth resonant sub-mode e is a fifth sub-band, a band of the sixth resonant sub-mode f is a sixth sub-band, a band of the seventh resonant sub-mode g is a seventh sub-band, and a band of the eighth resonant sub-mode h is an eighth sub-band. In an implementation, the fifth sub-band ranges from 1900 MHz to 2000 MHz, the sixth sub-band ranges from 2600 MHz to 2700 MHz, and the seventh sub-band ranges from 3800 MHz to 3900 MHz, and the eighth sub-band ranges from 4700 MHz to 4800 MHz. In other words, electromagnetic wave signals of the multiple third resonant modes are in the MHB (1000 MHz to 3000 MHz) and the UHB (3000 MHz to 1000 MHz). By adjusting resonant frequencies of the above resonant modes, the third antenna element 30 can cover both the MHB and the UHB, and thus can have high efficiency in a desired band.

Optionally, a structure of the third antenna element 30 is the same as a structure of the first antenna element 10. A capacitive coupling effect between the third antenna element 30 and the second antenna element 20 is the same as a capacitive coupling effect between the first antenna element 10 and the second antenna element 20. As such, during operation of the antenna assembly 100, a third excitation signal generated by the third signal source 32 can be coupled to the second radiator 21 through the third radiator 31. In other words, during operation of the third antenna element 30, not only the third radiator 31 can be used to transmit/receive an electromagnetic wave signal, but also the second radiator 21 of the second antenna element 20 can be used to transmit/receive an electromagnetic wave signal, so that the third antenna element 30 can has a widened bandwidth without an additional radiator(s).

The first antenna element 10 is configured to transmit/receive an electromagnetic wave signal of the MHB and the UHB, the second antenna element 20 is configured to transmit/receive an electromagnetic wave signal of the LB, and the third antenna element 30 is configured to transmit/receive an electromagnetic wave signal of the MHB and the UHB, the first antenna element 10 is isolated from the second antenna element 20 through bands to avoid mutual interference of signals, and the second antenna element 20 is isolated from the third antenna element 30 through bands to avoid mutual interference of signals; and the first antenna element 10 is isolated from the third antenna element 30 through a physical spacing to avoid mutual interference of signals, which facilitates control of the antenna assembly 100 to transmit/receive an electromagnetic wave signal of a desired band.

In addition, the first antenna element 10 and the third antenna element 30 may be disposed at different positions the electronic device 1000, or disposed at the electronic device 1000 with different orientations, facilitating switching in different scenarios. For example, when the electronic device 1000 is switched between a landscape mode and a portrait mode, it may be switched between the first antenna element 10 and the third antenna element 30, or it can be switched to the third antenna element 30 when the first antenna element 10 is blocked and it can be switched to the third antenna element 30 when the third antenna element 30 is blocked, so that relatively good transmission/reception of an electromagnetic wave of the MHB and an electromagnetic wave of the UHB can be achieved in different scenarios.

In the implementations, an example that the antenna assembly 100 has the first antenna element 10, the second antenna element 20, and the third antenna element 30 is taken for illustrating a tuning manner for achieving coverage of electromagnetic wave signals of all LBs, all MHBs, and all UHBs of 4G and 5G.

Figure 16:
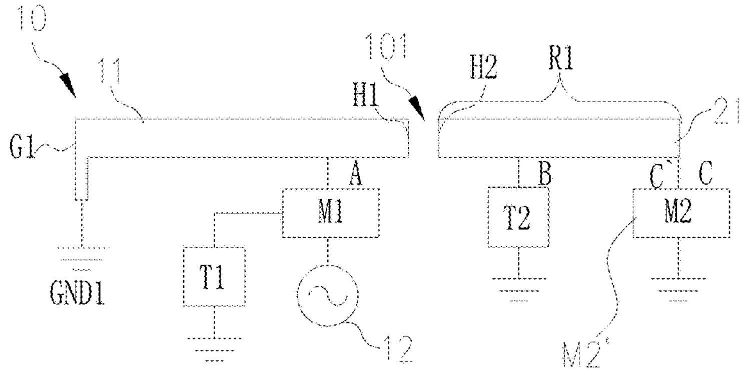
FIG. 16 is an equivalent circuit diagram of the first antenna element in FIG. 4.

Referring to FIG. 4 and FIG. 16, the second radiator 21 includes a first coupling point C' disposed between the second coupling end H2 and the third coupling end H3. Part of the second radiator 21 between the first coupling point C' and an end of the second radiator 21 is configured to be coupled to other adjacent radiators.

When the first coupling point C' is close to the second coupling end H2, part of the second radiator 21 between the first coupling point C' and the second coupling end H2 is configured to be coupled to the first radiator 11. Further, the second antenna element 20 has a first coupling section R1 between the first coupling point C' and the second coupling end H2. The first coupling section R1 is configured to be in capacitive coupling with the first radiator 11. A length of the first coupling segment R1 is equal to 1/4*where $\lambda_1$ is a wavelength of the electromagnetic wave signal of the first band.

When the first coupling point C' is close to the third coupling end H3, part of the second radiator 21 between the first coupling point C' and the third coupling end H3 is configured to be coupled to the third radiator 31. The part of the second radiator 21 between the first coupling point C' and the third coupling end H3 is configured to be in capacitive coupling with the third radiator 31, and a length of the second radiator 21 between the first coupling point C' and the third coupling end H3 is equal to $1/4*\lambda_2$. where $\lambda_2$ is a wavelength of the electromagnetic wave signal of the third band.

In the implementations of the disclosure, an example that the first coupling point C' is close to the second coupling end H2 is taken for illustration. The following arrangements of the first coupling point C' are also applicable to a situation that the first coupling point C' is close to the third coupling end H3.

The first coupling point C' is configured to be grounded, and thus, in the case where the first excitation signal transmitted by the first signal source 12 is transmitted to the first radiator 11 from the first feeding point A after being filtered by the first FT filter circuit M1, the first excitation signal can act on the first radiator 11 in various manners. For example, in one manner, the first excitation signal can act along a path from the first feeding point A to the first ground end G1, and then enter the reference ground 40 from the first ground end G1 to form an antenna loop; in another manner, the first excitation signal can act along a path from the first feeding point A to the first coupling end H1, then be coupled to the second coupling end H2 and the first coupling point C' through the first gap 101, and finally enter the reference ground 40 from the first coupling point C' to form another coupled antenna loop.

In some implementations, the first antenna element 10 is configured to generate the first resonant sub-mode a when part of the first antenna element 10 between the first ground end G1 and the first coupling end H1 operates in a fundamental mode. In some implementations, when the first excitation signal generated by the first signal source 12 acts on the part of the first antenna element 10 between the first ground end G1 and the first coupling end H1, the first resonant sub-mode a is generated, and an efficiency is relatively high at a resonant frequency of the first resonant sub-mode a, thereby improving a communication quality of the electronic device 1000 at the resonant frequency of the first resonant sub-mode a. It can be understood that, the fundamental mode is also a ¼ wavelength mode, and is also a relatively efficient resonant mode. The part of the first antenna element 10 between the first ground end G1 and the first coupling end H1 operates in the fundamental mode, and an effective electrical length between the first ground end G1 and the first coupling end H1 is equal to ¼ wavelength of the resonant frequency of the first resonant sub-mode a.

Figure 17:
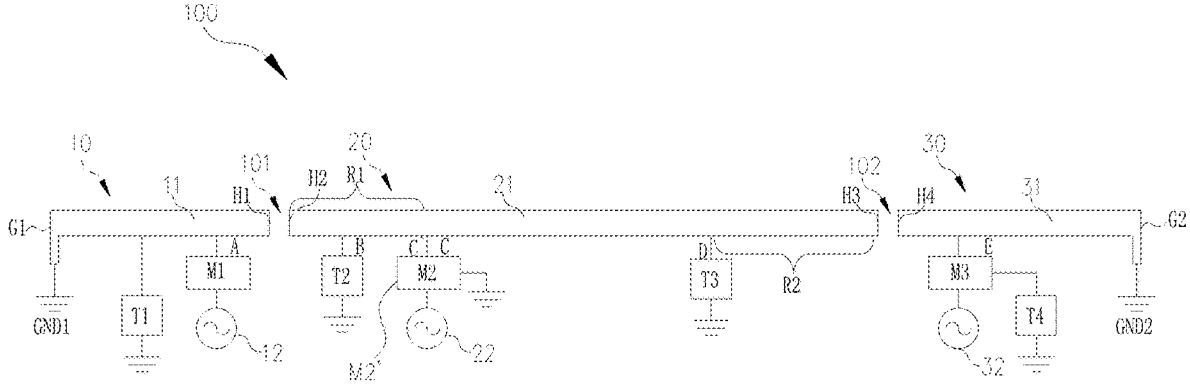
FIG. 17 is a schematic circuit diagram of a second type of antenna assembly in FIG. 3.

Referring to FIG. 16 and FIG. 17, the first antenna element 10 further includes a first FT circuit T1. In an implementation, the first FT circuit T1 is used for matching adjustment. In some implementations, one port of the first FT circuit T1 is electrically connected to the first FT filter circuit M1, and the other port of the first FT circuit T1 is grounded. In another implementation, the first FT circuit T1 is used for aperture adjustment. In some implementations, one port of the first FT circuit T1 is electrically connected to a position of the first antenna element 10 between the first ground end G1 and the first feeding point A, and the other port of the first FT circuit T1 is grounded. In both of the above two connection manners, the first FT circuit T1 can adjust the resonant frequency of the first resonant sub-mode a by adjusting an impedance of the first radiator 11.

In an implementation, the first FT circuit T1 includes, but is not limited to, a capacitor(s), an inductor(s), and a resistor(s) that are connected in series and/or in parallel. The first FT circuit T1 may include multiple branches formed by a capacitor(s), an inductor(s), and a resistor(s) that are connected in series and/or in parallel, and switches that control connection/disconnection of the multiple branches. By controlling on/off of different switches, the frequency selection parameters (including a resistance value, an inductance value, and a capacitance value) of the first FT circuit T1 can be adjusted, thereby adjusting an impedance of the second radiator 21 to adjust the resonant frequency of the first resonant sub-mode a. As for a specific structure of the first FT circuit T1, reference can be made to a specific structure of the first FT filter circuit M1.

In some implementations, the resonant frequency of the first resonant sub-mode a ranges from 1900 MHz to 2000 MHz. When the electronic device 1000 needs to transmit/receive an electromagnetic wave signal of 1900 MHz to 2000 MHz, a FT parameter (for example, a resistance value, a capacitance value, and an inductance value) of the first FT circuit T1 can be adjusted, so that the first antenna element 10 can operate in the first resonant sub-mode a. When the electronic device 1000 needs to transmit/receive an electromagnetic wave signal of 1800 MHz to 1900 MHz, the FT parameter (for example, a resistance value, a capacitance value, and an inductance value) of the first FT circuit T1 can be further adjusted, so that the resonant frequency of the first resonant sub-mode a can shift towards a LB. When the electronic device 1000 needs to transmit/receive an electromagnetic wave signal of 2000 MHz to 2100 MHz, the FT parameter (for example, a resistance value, a capacitance value, and an inductance value) of the first FT circuit T1 can be further adjusted, so that the resonant frequency of the first resonant sub-mode a can shift towards a HB. In this way, the first antenna element 10 can cover a relatively wide band by adjusting the FT parameter of the first FT circuit T1.

A specific structure of the first FT circuit T1 is not limited herein, and an adjustment manner of the first FT circuit T1 is also not limited herein.

In another implementation, the first FT circuit T1 includes, but is not limited to, a variable capacitor. By adjusting a capacitance value of the variable capacitor, the FT parameter of the first FT circuit T1 can be adjusted, thereby adjusting the impedance of the first radiator 11 to adjust the resonant frequency of the first resonant sub-mode a.

The first antenna element 10 is configured to generate the second resonant sub-mode b when the first coupling section R1 operates in the fundamental mode. A resonant frequency of the second resonant sub-mode b is greater than the resonant frequency of the first resonant sub-mode a. In some implementations, the second resonant sub-mode b is generated when the first excitation signal generated by the first signal source 12 acts on part of the second antenna element 20 between the second coupling end H2 and the first coupling point C, an efficiency is relatively high at the resonant frequency of the second resonant sub-mode b, thereby improving the communication quality of the electronic device 1000 at the resonant frequency of the second resonant sub-mode b.

Referring to FIG. 4 and FIG. 16, the second antenna element 20 further includes a second FT circuit MT. The second FT circuit M2' is used for aperture adjustment. In some implementations, one port of the second FT circuit M2' is electrically connected to the first coupling point C', and another port of the second FT circuit M2' away from the first coupling point C is configured to be grounded. The second FT circuit M2' is configured to adjust the resonant frequency of the second resonant sub-mode b by adjusting an impedance of the first coupling segment R1.

In an implementation, the second FT circuit M2' includes, but is not limited to, a capacitor(s), an inductor(s), and a resistor(s) that are connected in series and/or in parallel. The second FT circuit M2' may include multiple branches formed by a capacitor(s), an inductor(s), and a resistor(s) that are connected in series and/or in parallel, and switches that control connection/disconnection of the multiple branches. By controlling on/off of different switches, frequency selection parameters (including a resistance value, an inductance value, and a capacitance value) of the second FT circuit M2' can be adjusted to adjust the impedance of the first coupling segment R1, so that the first antenna element 10 can transmit/receive an electromagnetic wave signal of the resonant frequency of the second resonant sub-mode b or of a frequency close to the resonant frequency of the second resonant sub-mode b.

In some implementations, the resonant frequency of the second resonant sub-mode b ranges from 2600 MHz to 2700 MHz. When the electronic device 1000 needs to transmit/receive an electromagnetic wave signal of 2600 MHz to 2700 MHz, a FT parameter (for example, a resistance value, a capacitance value, and an inductance value) of the second FT circuit M2' can be adjusted, so that the first antenna element 10 can operate in the second resonant sub-mode b. When the electronic device 1000 needs to transmit/receive an electromagnetic wave signal of 2500 MHz to 2600 MHz, the FT parameter (for example, a resistance value, a capacitance value, and an inductance value) of the second FT circuit M2' can be further adjusted, so that the resonant frequency of the second resonant sub-mode b can shift towards a LB. When the electronic device 1000 needs to transmit/receive an electromagnetic wave signal of 2700 MHz to 2800 MHz, the FT parameter (for example, a resistance value, a capacitance value, and an inductance value) of the second FT circuit M2' can be further adjusted, so that the resonant frequency of the second resonant sub-mode b can shift towards a HB. In this way, the first antenna element 10 can cover a relatively wide band by adjusting the FT parameter of the second FT circuit M2'.

A specific structure of the second FT circuit M2' is not limited herein, and an adjustment manner of the second FT circuit M2' is also not limited herein.

In another implementation, the second FT circuit M2' includes, but is not limited to, a variable capacitor. By adjusting a capacitance value of the variable capacitor, the FT parameter of the second FT circuit M2' can be adjusted, thereby adjusting the impedance of the first coupling segment R1 to adjust the resonant frequency of the second resonant sub-mode b.

The first antenna element 10 is configured to generate the third resonant sub-mode c when part of the first antenna element 10 between the first feeding point A and the first coupling end H1 operates in the fundamental mode. A resonant frequency of the third resonant sub-mode c is greater than the resonant frequency of the second resonant sub-mode b.

In some implementations, when the first excitation signal generated by the first signal source 12 acts on the part of the first antenna element 10 between the first feeding point A and the first coupling end H1, the third resonant sub-mode c is generated, a transmission/reception efficiency is relatively high at the resonant frequency of the third resonant sub-mode c, thereby improving the communication quality of the electronic device 1000 at the resonant frequency of the third resonant sub-mode c.

Referring to FIG. 4, the second radiator 21 further includes a first FT point B. The first FT point B is disposed between the second coupling end H2 and the first coupling point C'. The second antenna element 20 further includes a third FT circuit T2. In an implementation, the third FT circuit T2 is used for aperture adjustment. In some implementations, one end of the third FT circuit T2 is electrically connected to the first FT point B, and the other end of the third FT circuit T2 is grounded. In another implementation, the third FT circuit T2 is used for matching adjustment. In some implementations, one end of the third FT circuit T2 is electrically connected to the second FT circuit M2', and the other end of the third FT circuit T2 is grounded. The third FT circuit T2 is configured to adjust the resonant frequency of the second resonant sub-mode b and the resonant frequency of the third resonant sub-mode c.

The third FT circuit T2 is configured to adjust the resonant frequency of the third resonant sub-mode c by adjusting an impedance of the part of the second radiator 21 between the second coupling end H2 and the first coupling point C'.

In an implementation, the third FT circuit T2 includes, but is not limited to, a capacitor(s), an inductor(s), and a resistor(s) that are connected in series and/or in parallel. The third FT circuit T2 may include multiple branches formed by a capacitor(s), an inductor(s), and a resistor(s) that are connected in series and/or in parallel, and switches that control connection/disconnection of the multiple branches. By controlling on/off of different switches, frequency selection parameters (including a resistance value, an inductance value, and a capacitance value) of the third FT circuit T2 can be adjusted to adjust the impedance of part of the second radiator 21 between the second coupling end H2 and the first coupling point C', so that the first antenna element 10 can transmit/receive an electromagnetic wave signal of the resonant frequency of the third resonant sub-mode c or of a frequency close to the resonant frequency of the third resonant sub-mode c.

In some implementations, the resonant frequency of the third resonant sub-mode c ranges from 3800 MHz to 3900 MHz. When the electronic device 1000 needs to transmit/receive an electromagnetic wave signal of 3800 MHz to 3900 MHz, a FT parameter (for example, a resistance value, a capacitance value, and an inductance value) of the third FT circuit T2 can be adjusted, so that the first antenna element 10 can operate in the third resonant sub-mode c. When the electronic device 1000 needs to transmit/receive an electromagnetic wave signal of 3700 MHz to 3800 MHz, the FT parameter (for example, a resistance value, a capacitance value, and an inductance value) of the third FT circuit T2 can be further adjusted, so that the resonant frequency of the third resonant sub-mode c can shift towards a LB. When the electronic device 1000 needs to transmit/receive an electromagnetic wave signal of 3900 MHz to 4000 MHz, the FT parameter (for example, a resistance value, a capacitance value, and an inductance value) of the third FT circuit T2 can be further adjusted, so that the resonant frequency of the third resonant sub-mode c can shift towards a HB. In this way, the frequency coverage of the first antenna element 10 can cover a relatively wide band by adjusting the FT parameter of the third FT circuit T2.

A specific structure of the third FT circuit T2 is not limited herein, and an adjustment manner of the third FT circuit T2 is also not limited herein.

In another implementation, the third FT circuit T2 includes, but is not limited to, a variable capacitor. By adjusting a capacitance value of the variable capacitor, the FT parameter of the third FT circuit T2 can be adjusted, thereby adjusting the impedance of the part of the second radiator 21 between the second coupling end H2 and the first coupling point C' to adjust the resonant frequency of the third resonant sub-mode c.

The first antenna element 10 is configured to generate the fourth resonant sub-mode d when the part of the first antenna element 10 between the first ground end G1 and the first coupling end H1 operates in a third-order mode.

In some implementations, when the first excitation signal generated by the first signal source 12 acts on the part of the first antenna element 10 between the first feeding point A and the first coupling end H1, the fourth resonant sub-mode d is also generated, a transmission/reception efficiency is relatively high at a resonant frequency of the fourth resonant sub-mode d, thereby improving the communication quality of the electronic device 1000 at the resonant frequency of the fourth resonant sub-mode d. The resonant frequency of the fourth resonant sub-mode d is greater than the resonant frequency of the third resonant sub-mode c. Similarly, the third FT circuit T2 can adjust the resonant frequency of the fourth resonant sub-mode d.

Optionally, the second feeding point C may be the first coupling point C'. The second FT circuit M2' may be the second FT filter circuit M2. In this way, the first coupling point C' can serve as the second feeding point C, so that the first coupling point C' can serve as a feeder of the second antenna element 20 and make the second antenna element 20 be able to be coupled to the first antenna element 10, such that the antenna is compact in structure. In other implementations, the second feeding point C may be disposed between the first coupling point C' and the third coupling end H3.

After being filtered and adjusted by the second FT circuit M2', the second excitation signal generated by the second signal source 22 acts on part of the second antenna element 20 between the first FT point B and the third coupling end H3, so that the second resonant mode can be generated.

Figure 18:
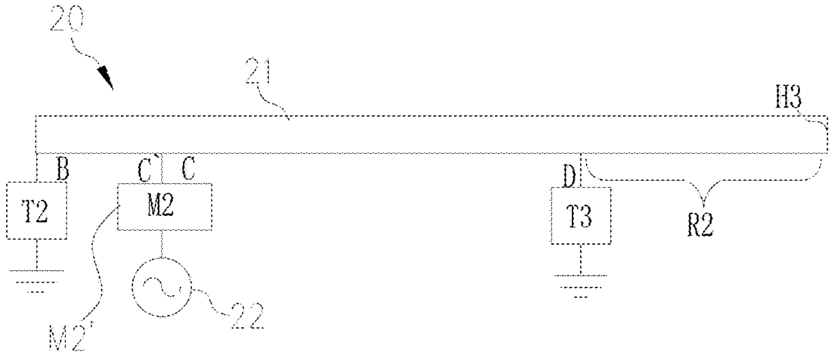
FIG. 18 is an equivalent circuit diagram of the second antenna element in FIG. 4.

Further, referring to FIG. 4 and FIG. 18, the second radiator 21 further includes a second FT point D. The second FT point D is disposed between the second feeding point C and the third coupling end H3. The second antenna element 20 further includes a fourth FT circuit T3. In an implementation, the fourth FT circuit T3 is used for aperture adjustment. In some implementations, one port of the fourth FT circuit T3 is electrically connected to the second FT point D, and the other port of the fourth FT circuit T3 is grounded.

Figure 19:
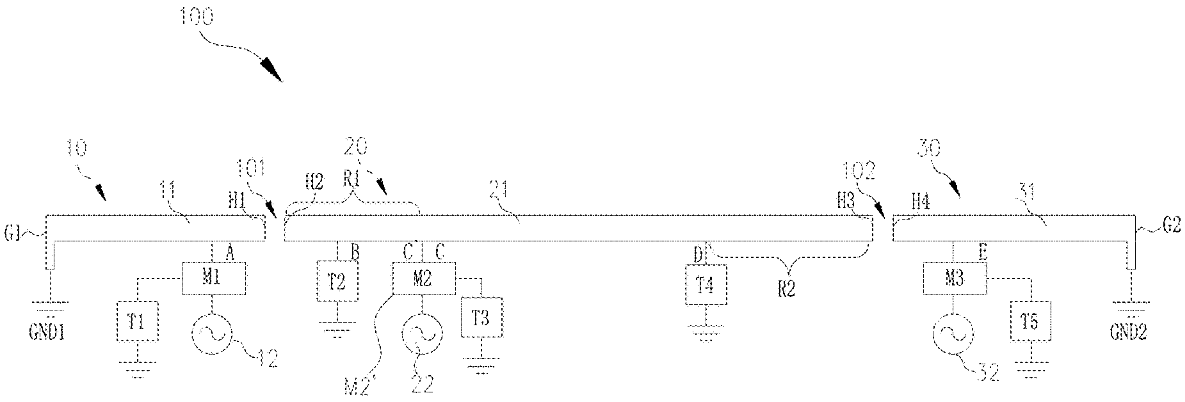
FIG. 19 is a schematic circuit diagram of a third type of antenna assembly in FIG. 3.

Referring to FIG. 19, in another implementation, one port of the second FT circuit M2' is electrically connected to the second FT circuit M2', and the other port of the fourth FT circuit T3' is grounded. The fourth FT circuit T3 is configured to adjust the resonant frequency of the second resonant mode by adjusting an impedance of the part of the second antenna element 20 between the first FT point B and the third coupling end H3.

A length of the second antenna element 20 between the first FT point B and the third coupling end H3 may be about a quarter of the wavelength of the electromagnetic wave signal of the second band, so that the second antenna element 20 has high radiation efficiency.

In addition, the first frequency regulation point B is grounded, and the first coupling point C' is the second feeding point C, so that the second antenna element 20 is an inverted-F antenna. An impedance matching of the second antenna element 20 in the form of inverted-F antenna can be easily adjusted by adjusting a position of the second feeding point C.

In an implementation, the fourth FT circuit T3 includes, but is not limited to, a capacitor(s), an inductor(s), and a resistor(s) that are connected in series and/or in parallel. The fourth FT circuit T3 may include multiple branches formed by a capacitor(s), an inductor(s), and a resistor(s) that are connected in series and/or in parallel, and switches that control connection/disconnection of the multiple branches. By controlling on/off of different switches, frequency selection parameters (including a resistance value, an inductance value, and a capacitance value) of the fourth FT circuit T3 can be adjusted, an impedance of part of the second radiator 21 between the first FT point B and the third coupling end H3 can be adjusted, thereby enabling the second antenna element 20 to transmit/receive an electromagnetic wave signal of the resonant frequency of the second resonant mode or of a frequency close to the resonant frequency of the second resonant mode.

In an implementation, referring to FIG. 14, when the electronic device 1000 needs to transmit/receive an electromagnetic wave signal of 700 MHz to 750 MHz, a FT parameter (for example, a resistance value, a capacitance value, and an inductance value) of the fourth FT circuit T3 can be adjusted, so that the second antenna element 20 can operate in the second resonant mode. When the electronic device 1000 needs to transmit/receive an electromagnetic wave signal of 500 MHz to 600 MHz, the FT parameter (for example, a resistance value, a capacitance value, and an inductance value) of the fourth FT circuit T3 can be further adjusted, so that the resonant frequency of the second vibration mode can shift towards a LB. When the electronic device 1000 needs to transmit/receive an electromagnetic wave signal of 800 MHz to 900 MHz, the FT parameter (for example, a resistance value, a capacitance value, and an inductance value) of the fourth FT circuit T3 can be further adjusted, so that the resonant frequency of the second resonant mode can shift towards a HB. For example, as illustrated in FIG. 14, the second antenna element 20 can shift from a frequency corresponding to mode 1 to a frequency corresponding to mode 2, a frequency corresponding to mode 3, or a frequency corresponding to mode 4. In this way, the second antenna element 20 can cover a relatively wide band by adjusting the FT parameter of the fourth FT circuit T3.

A specific structure of the fourth FT circuit T3 is not limited herein, and an adjustment manner of the fourth FT circuit T3 is also not limited herein.

In another implementation, the fourth FT circuit T3 includes, but is not limited to, a variable capacitor. By adjusting a capacitance value of the variable capacitor, the FT parameter of the fourth FT circuit T3 can be adjusted, thereby adjusting the impedance of the part of the second radiator 21 between the first FT point B and the third coupling end H3 to adjust the resonant frequency of the second resonant mode.

A position of the second FT point D is a position where the first coupling point C' is located when the first coupling point C' is close to the third coupling end H3. Hence, the second coupling section R2 between the second FT point D and the third coupling end H3 is formed, and the second coupling section R2 is configured to be coupled to the third radiator 31 through the second gap 102, so that a sixth resonant sub-mode f and a seventh resonant sub-mode g can be generated.

It can be seen from the above that, by providing FT circuits and adjusting parameters of the FT circuits, the first antenna element 10 can cover both the MHB and the UHB, the second antenna element 20 can cover the LB, and the third antenna element 30 can cover both the MHB and the UHB, and thus, the antenna assembly 100 can cover all of the LB, the MHB, and the UHB, enhancing communication function. The multiplexing of the radiators of the antenna elements can reduce the overall size of the antenna assembly 100, thereby facilitating overall miniaturization.

Figure 20:
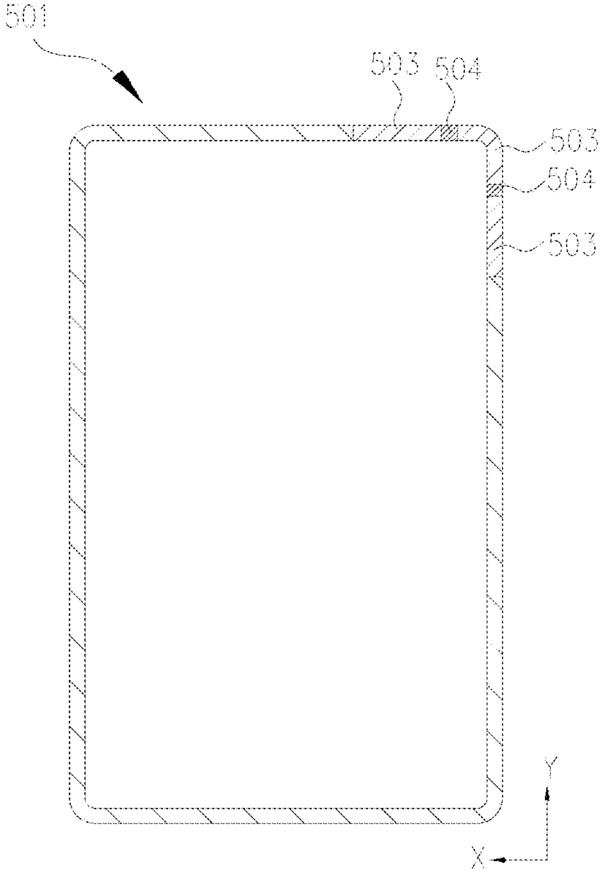
FIG. 20 is a schematic structural view of a middle frame in FIG. 2.

In an implementation, referring FIG. 2 and FIG. 20, the antenna assembly 100 is partially integrated with the housing 500. In some implementations, the reference ground 40, signal sources, and FT circuits of the antenna assembly 100 are all disposed at the main printed circuit board 200. The first radiator 11, the second radiator 21, and the third radiator 31 are integrated as part of the housing 500. Further, the housing 500 includes a middle frame 501 and a battery cover 502. The display screen 300, the middle frame 501, and the battery cover 502 sequentially fit with each other. The first radiator 11, the second radiator 21, and the third radiator 31 are embedded in the middle frame 501 to serve as part of the middle frame 501. Optionally, referring to FIG. 20 and FIG. 21, the middle frame 501 includes multiple metal sections 503 and multiple insulation sections 504, where each insulation section 504 is arranged between two adjacent metal sections 503. The multiple metal sections 503 form the first radiator 11, the second radiator 21, and the third radiator 31 respectively. The insulation section 504 between the first radiator 11 and the second radiator 21 is filled in the first gap 101, and the insulation section 504 between the second radiator 21 and the third radiator 31 is filled in the second gap 102. Alternatively, the first radiator 11, the second radiator 21, and the third radiator 31 are embedded in the battery cover 502 to serve as part of the battery cover 502.

Figure 22:
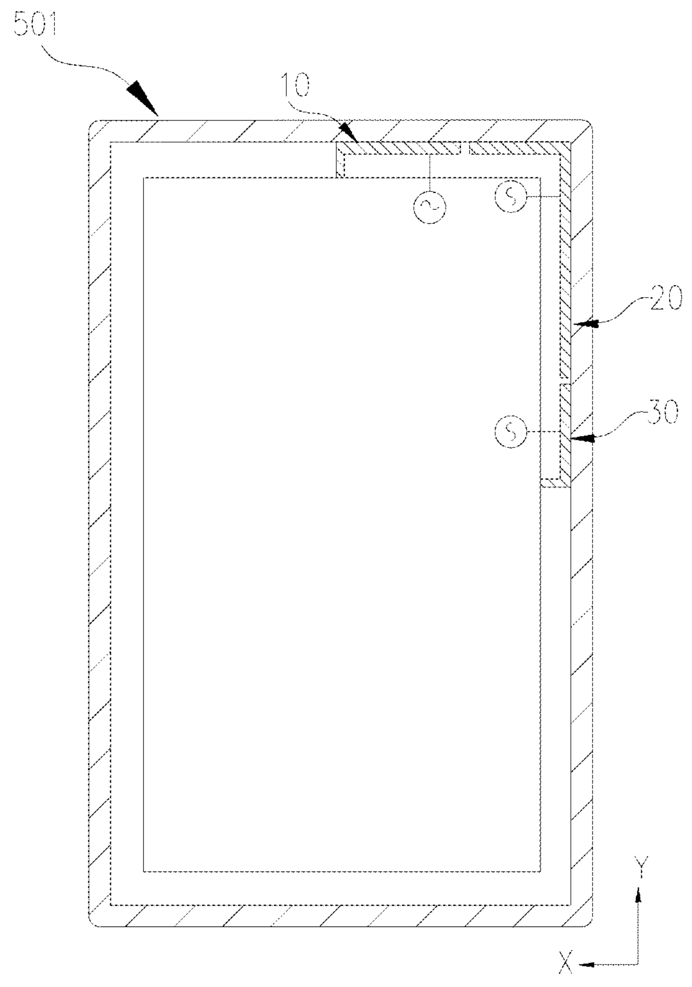
FIG. 22 is a schematic structural view of a second type of antenna assembly disposed at the housing provided in implementations of the disclosure.

In another implementation, referring to FIG. 22, the antenna assembly 100 is disposed within the housing 500. The reference ground 40, the signal sources, and the FT circuits of the antenna assembly 100 are disposed at the main printed circuit board 200. The first radiator 11, the second radiator 21, and the third radiator 31 may be formed on a flexible circuit board and attached to an inner surface of the housing 500.

Figure 21:
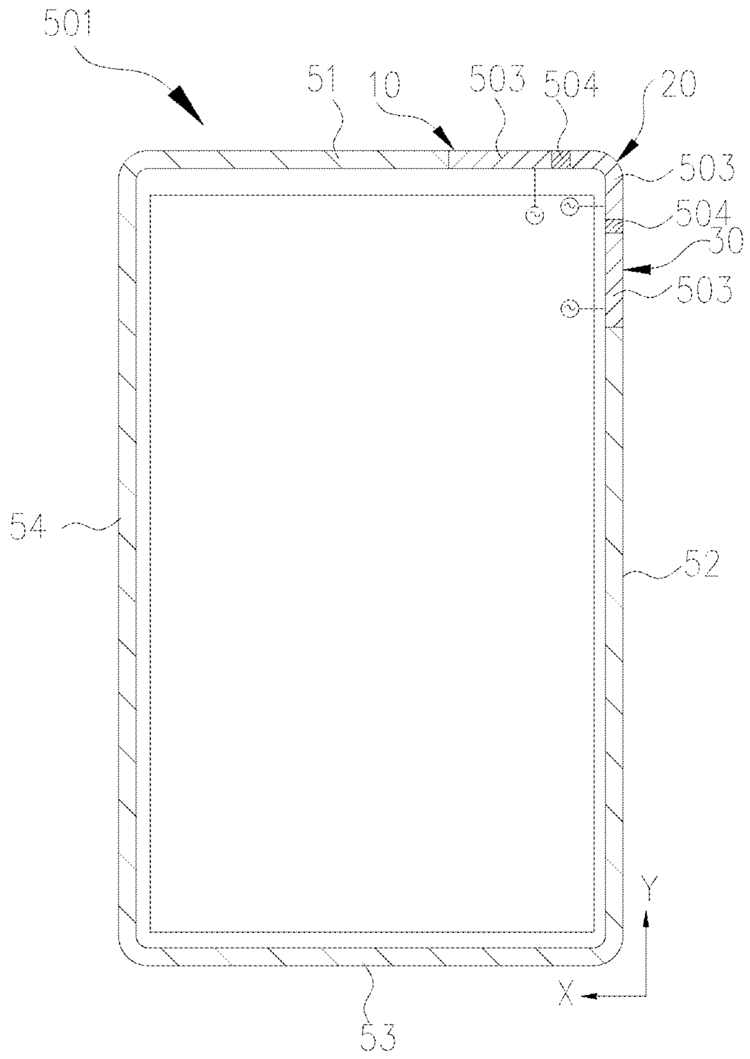
FIG. 21 is a schematic structural view of the first type of antenna assembly disposed at a housing provided in implementations of the disclosure.

Referring to FIG. 21, the housing 500 includes a first edge 51, a second edge 52, a third edge 53, and a fourth edge 54 that are connected end to end in sequence. The first edge 51 is disposed opposite to the third edge 53. The second edge 52 is disposed opposite to the fourth edge 54. A length of the first edge 51 is less than a length of the second edge 52. A junction of two adjacent edges forms a corner of the housing 500. Further, when the electronic device 1000 is held by a user to be in a vertical direction, the first edge 51 is away from the ground, and the third edge 53 is close to the ground.

In an implementation, referring to FIG. 21, the first antenna element 10 and part of the second antenna element 20 are disposed at the first edge 51, and the third antenna element 30 and another part of the second antenna element 20 are disposed at the second edge 52. In some implementations, the first radiator 11 is disposed at the first edge 51 or along the first edge 51 of the housing 500. The second radiator 21 is disposed at the first edge 51, the second edge 52, and a corner between the first edge 51 and the second edge 52. The third radiator 31 is disposed at the second edge 52 of the housing 500 or along the second edge 52.

The electronic device 1000 further a controller 103. The controller 103 is configured to control an operating power of the first antenna element 10 to be greater than an operating power of the third antenna element 30 when the display screen 300 is in a portrait mode or when a subject to-be-detected is close to the second edge 52. In some implementations, when the display screen 300 is in the portrait mode or the electronic device 1000 is held by the user to be in the vertical direction, the second edge 52 and the fourth edge 54 may generally be covered by a finger. In this case, the controller 103 may control the first antenna element 10 disposed at the first edge 51 to transmit/receive an electromagnetic wave signal of the MHB and the UHB, and thus the electromagnetic wave signal of the MHB and the UHB can be transmitted/received even if the third antenna element 30 disposed at the second edge 52 is blocked by the finger, avoiding affecting communication quality of the MHB and the UHB of the electronic device 1000.

The controller 103 is further configured to control the operating power of the third antenna element 30 to be greater than the operating power of the first antenna element 10 when the display screen 300 is in a landscape mode. In some implementations, when the display screen 300 is in the landscape mode or the electronic device 1000 is holed by the user to be in a horizontal direction, the first edge 51 and the third edge 53 are generally covered by a finger. In this case, the controller 103 may control the third antenna element 30 disposed at the second edge 52 to transmit/receive the electromagnetic wave signal of the MHB and the UHB, and thus the electromagnetic wave signal of the MHB and the UHB can be transmitted/received even if the first antenna element 10 disposed at the first edge 51 is blocked by the finger, avoiding affecting the communication quality of the MHB and the UHB of the electronic device 1000.

The controller 103 is further configured to control the operating power of the third antenna element 30 to be greater than the operating power of the first antenna element 10 when the subject to-be-detected is close to the first edge 51.

In some implementations, when the user makes a phone call through the electronic device 1000 or when the electronic device 1000 is close to a head, the controller 103 may control the third antenna element 30 disposed at the second edge 52 to transmit/receive the electromagnetic wave of the MHB and the UHB, thereby reducing transmission/reception power of electromagnetic waves near a head of a human body, and further reducing a specific absorption rate of the human body to the electromagnetic waves.

Figure 23:
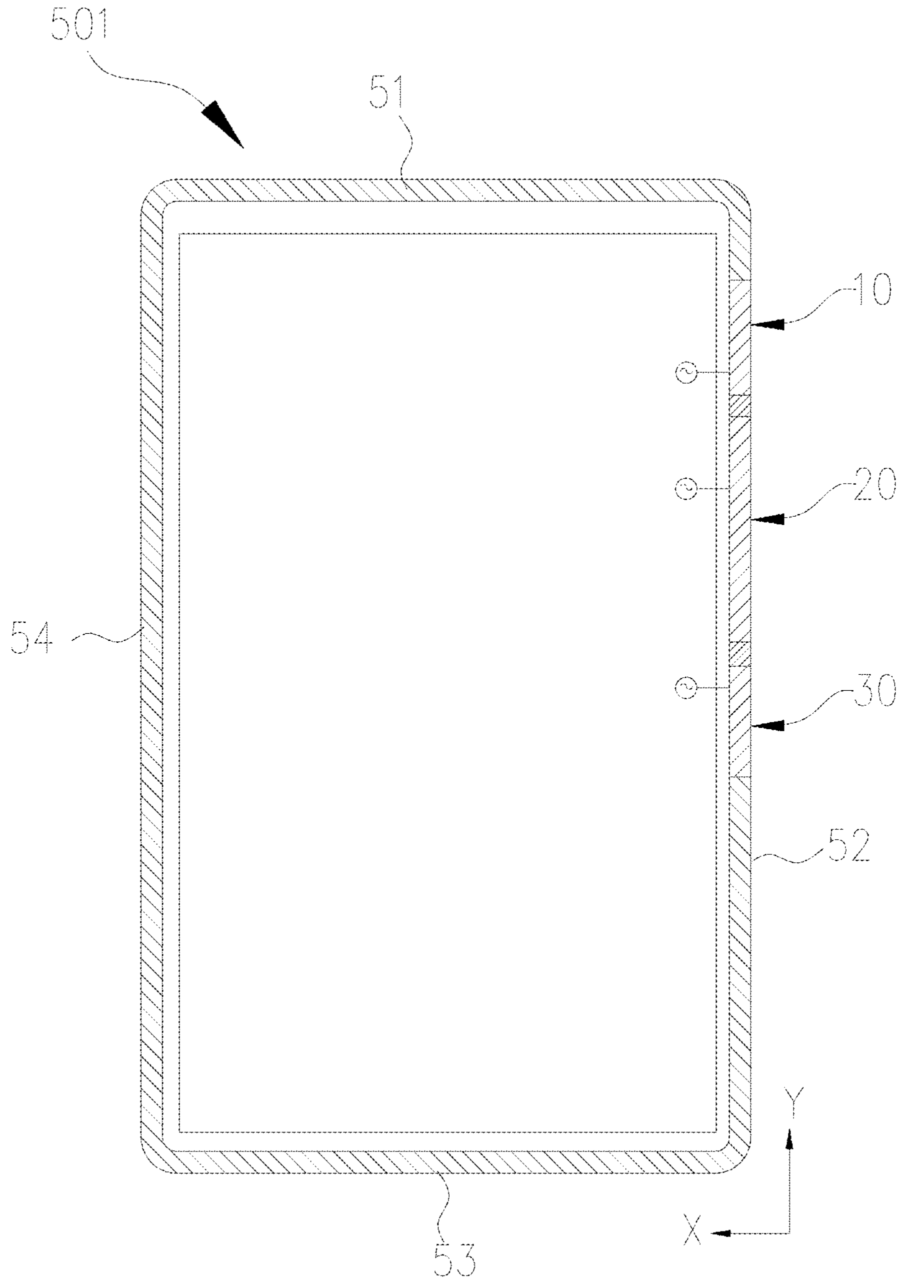
FIG. 23 is a schematic structural view of a third type of antenna assembly disposed at the housing provided in implementations of the disclosure.

In another implementation, referring to FIG. 23, the first antenna element 10, the second antenna element 20, and the third antenna element 30 are all disposed at the same edge of the housing 500.

The above are only some implementations of the disclosure. It is noted that, a person skilled in the art may make further improvements and modifications without departing from the principle of the disclosure, and these improvements and modifications shall also belong to the scope of protection of the disclosure.

What is claimed is:

1. An antenna assembly comprising:

a first antenna element configured to generate a plurality of first resonant modes to transmit and receive an electromagnetic wave signal of a first band, wherein the first antenna element comprises a first radiator; and a second antenna element configured to generate at least one second resonant mode to transmit and receive an electromagnetic wave signal of a second band, wherein a maximum frequency of the second band is less than a minimum frequency of the first band, the second antenna element comprises a second radiator, a first gap is defined between the second radiator and the first radiator, and the second radiator is configured to be in capacitive coupling with the first radiator through the first gap;

wherein at least one of the plurality of first resonant modes is formed through the capacitive coupling between the first radiator and the second radiator;

wherein:

the first antenna element further comprises a first signal source;

the first radiator comprises a first ground end, a first feeding point, and a first coupling end, wherein the first ground end is configured to be grounded, the first feeding point is disposed between the first ground end and the first coupling end, the first feeding point is electrically connected to the first signal source, and the first coupling end is adjacent to the first gap; and the second radiator comprises a second coupling end and a first coupling point, wherein the first gap is defined between the second coupling end and the first coupling end, the first coupling point is disposed at one side of the second coupling end away from the first coupling end, and the first coupling point is configured to be grounded.

2. The antenna assembly of claim 1, further comprising a third antenna element, wherein the third antenna element is configured to generate a plurality of third resonant modes to transmit and receive an electromagnetic wave signal of a third band, a minimum frequency of the third band is greater than a maximum frequency of the second band, and the third antenna element comprises a third radiator, wherein the third radiator is disposed at a side of the second radiator away from the first radiator, a second gap is defined between the third radiator and the second radiator, the third radiator is configured to be in capacitive coupling with the second radiator through the second gap, and at least one of the plurality of third resonant modes is formed through the capacitive coupling between the second radiator and the third radiator.

3. The antenna assembly of claim 2, wherein a structure of the third antenna element is the same as a structure of the first antenna element, the maximum frequency of the second band is less than 1000 MHz, a minimum frequency of the first band is greater than or equal to 1000 MHz, and the minimum frequency of the third band is greater than or equal to 1000 MHz.

4. The antenna assembly of claim 1, wherein the first antenna element is configured to generate a first resonant sub-mode when part of the first antenna element between the first ground end and the first coupling end operates in a fundamental mode, wherein the plurality of first resonant modes comprise the first resonant sub-mode.

5. The antenna assembly of claim 4, wherein the first antenna element further comprises a first frequency-tuning (FT) filter circuit, wherein the first FT filter circuit is electrically connected between the first feeding point and the first signal source and is configured to filter out a clutter in a radio frequency (RF) signal transmitted by the first signal source.

6. The antenna assembly of claim 5, wherein the first antenna element further comprises a first FT circuit, one port of the first FT circuit is electrically connected to the first FT filter circuit, and the other port of the first FT circuit is grounded; and/or, one port of the first FT circuit is electrically connected between the first ground end and the first feeding point, the other port of the first FT circuit is grounded, and the first FT circuit is configured to adjust a resonant frequency of the first resonant sub-mode.

7. The antenna assembly of claim 4, wherein the second antenna element has a first coupling section between the first coupling point and the second coupling end, wherein the first coupling section is configured to be in capacitive coupling with the first radiator, and the first antenna element is configured to generate a second resonant sub-mode when the first coupling section operates in the fundamental mode; wherein the plurality of first resonant modes further comprise the second resonant sub-mode, and a resonant frequency of the second resonant sub-mode is greater than a resonant frequency of the first resonant sub-mode.

8. The antenna assembly of claim 7, wherein a length of the first coupling section is equal to $1/4*\lambda_1$, wherein $\lambda_1$ is a wavelength of the electromagnetic wave signal of the first band.

9. The antenna assembly of claim 7, wherein the second antenna element further comprises a second FT circuit, wherein the second FT circuit is electrically connected to the first coupling point, one port of the second FT circuit away from the first coupling point is configured to be grounded, and the second FT circuit is configured to adjust the resonant frequency of the second resonant sub-mode.

10. The antenna assembly of claim 9, wherein the first antenna element is configured to generate a third resonant sub-mode when part of the first antenna element between the first feeding point and the first coupling end operates in the fundamental mode; wherein the plurality of first resonant modes further comprise the third resonant sub-mode, and a resonant frequency of the third resonant sub-mode is greater than the resonant frequency of the second resonant sub-mode.

11. The antenna assembly of claim 10, wherein:

the second radiator further comprises a first FT point, wherein the first FT point is disposed between the second coupling end and the first coupling point; and the second antenna element further comprises a third FT circuit, wherein one port of the third FT circuit is electrically connected to the first FT point and/or the second FT circuit, and the other port of the third FT circuit is grounded, and wherein the third FT circuit is configured to adjust the resonant frequency of the second resonant sub-mode and the resonant frequency of the third resonant sub-mode.

12. The antenna assembly of claim 11, wherein:

the second radiator further comprises a second feeding point, wherein the second feeding point is the first coupling point; and the second antenna element further comprises a second signal source electrically connected to one port of the second FT circuit away from the first coupling point, wherein the second FT circuit is further configured to filter out a clutter in an RF signal transmitted by the second signal source.

13. The antenna assembly of claim 12, wherein the second radiator has a third coupling end opposite the second coupling end, and the second antenna element is configured to generate the at least one second resonant mode when part of second antenna element between the first FT point and the third coupling end operates in the fundamental mode.

14. The antenna assembly of claim 13, wherein:

the second radiator further comprises a second FT point disposed between the second feeding point and the third coupling end; and the second antenna element further comprises a fourth FT circuit, wherein one port of the fourth FT circuit is electrically connected to the second FT point and/or the second FT circuit, the other port of the fourth FT circuit is grounded, and the fourth FT circuit is configured to adjust a resonant frequency of the second resonant mode.

15. The antenna assembly of claim 14, wherein the second antenna element has a second coupling section between the second FT point and the third coupling end, and a length of the second coupling section is equal to $1/4*\lambda_2$, wherein $\lambda_2$ is a wavelength of the electromagnetic wave signal of corresponding to the second band.

16. The antenna assembly of claim 10, wherein the first antenna element is configured to generate a fourth resonant sub-mode when the part of the first antenna element between the first ground end and the first coupling end operates in a third-order mode; wherein the plurality of first resonant modes further comprise the fourth resonant sub-mode, and a resonant frequency of the fourth resonant sub-mode is greater than the resonant frequency of the third resonant sub-mode.

17. An electronic device, comprising:

a housing and an antenna assembly, wherein the antenna assembly is partially integrated at the housing; or the antenna assembly is disposed inside the housing, and the antenna assembly comprises a first antenna element and a second antenna element;

wherein the first antenna element is configured to generate a plurality of first resonant modes to transmit and receive an electromagnetic wave signal of a first band, wherein the first antenna element comprises a first radiator; and wherein the second antenna element is configured to generate at least one second resonant mode to transmit and receive an electromagnetic wave signal of a second band, wherein a maximum frequency of the second band is less than a minimum frequency of the first band, the second antenna element comprises a second radiator, a first gap is defined between the second radiator and the first radiator, and the second radiator is configured to be in capacitive coupling with the first radiator through the first gap;

wherein at least one of the plurality of first resonant modes is formed through the capacitive coupling between the first radiator and the second radiator;

wherein:

the first antenna element further comprises a first signal source;

the first radiator comprises a first ground end, a first feeding point, and a first coupling end, wherein the first ground end is configured to be grounded, the first feeding point is disposed between the first ground end and the first coupling end, the first feeding point is electrically connected to the first signal source, and the first coupling end is adjacent to the first gap; and the second radiator comprises a second coupling end and a first coupling point, wherein the first gap is defined between the second coupling end and the first coupling end, the first coupling point is disposed at one side of the second coupling end away from the first coupling end, and the first coupling point is configured to be grounded.

18. The electronic device of claim 17, wherein:

the housing comprises a first edge, a second edge, a third edge, and a fourth edge that are connected end to end in sequence, wherein the first edge is disposed opposite to the third edge, and the second edge is disposed opposite to the fourth edge, a length of the first edge is less than a length of the second edge, the first antenna element and part of the second antenna element are disposed at the first edge, the third antenna element and another part of the second antenna element are disposed at the second edge; and the electronic device further comprises a display screen and a controller, wherein the controller is configured to control an operating power of the first antenna element to be greater than an operating power of the third antenna element when the display screen is in a portrait mode or when a subject to-be-detected is close to the second edge, and to control the operating power of the third antenna element to be greater than the operating power of the first antenna element when the display screen is in a landscape mode or when the subject to-be-detected is close to the first edge.

19. The electronic device of claim 18, wherein the first antenna element, the second antenna element, and the third antenna element are all disposed at a same side of the housing.

* * * * *